(No Model.)
G. F. ARMSTRONG.
TRUCK.
No. 513,748. Patented Jan. 30, 1894.
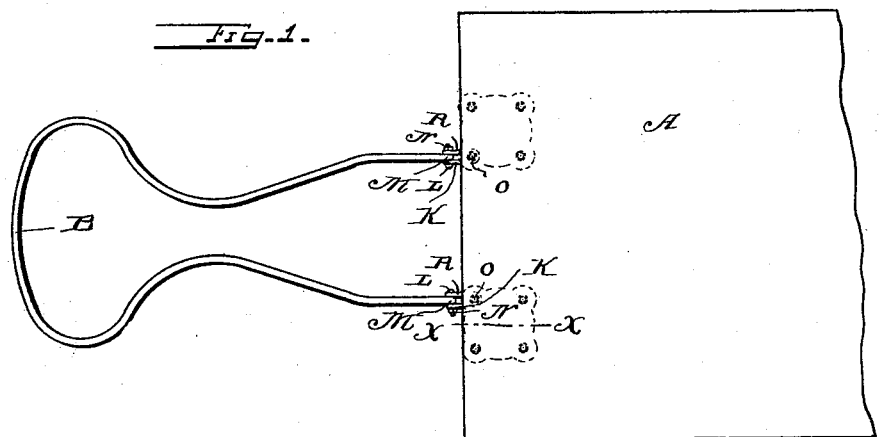
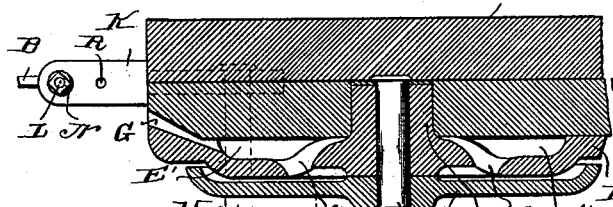
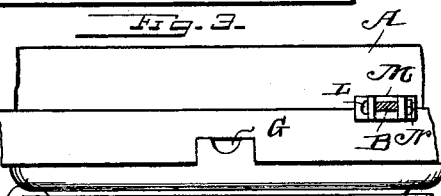
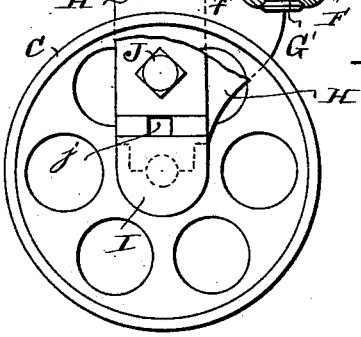
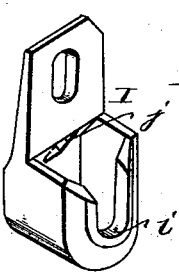
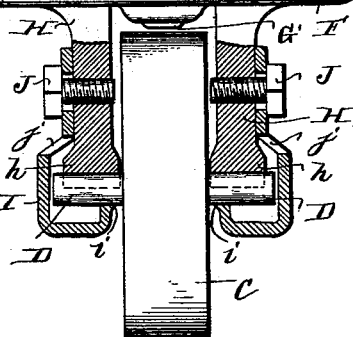
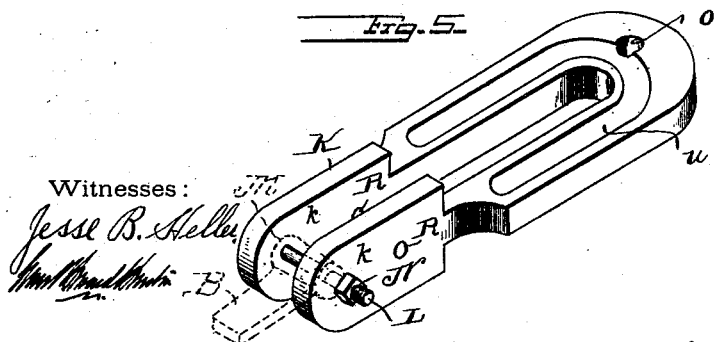
Witnesses:
Jesse B. Heller
Inventor.
George F. Armstrong
by
Attorney.
THE NATIONAL LITHOGRAPHING COMPANY,
WASHINGTON, D. C.

United States Patent Office.

GEORGE F. ARMSTRONG, OF PHILADELPHIA, PENNSYLVANIA.

TRUCK.

SPECIFICATION forming part of Letters Patent No. 513,748, dated January 30, 1894.

Application filed May 13, 1893. Serial No. 474,050. (No model.)

*To all whom it may concern:*

Be it known that I, GEORGE F. ARMSTRONG, of the city and county of Philadelphia and State of Pennsylvania, have invented an Improvement in Trucks, of which the following is a specification.

My invention relates to trucks for merchandise, &c., and consists of certain improvements which are fully set forth in the following specification and shown in the accompanying drawings.

The present improvements relate particularly to the casters with which said trucks are usually provided for the purpose of permitting them to be moved freely in any direction and to the devices for securing the tongues or handles of the platform or body of the truck.

My improvements so far as they relate to the casters are designed to enable longer axles to be employed upon the caster wheels and to increase the bearing surfaces for the axles and to facilitate the lubrication thereof.

My improved devices for attaching the tongues or handles to the platform are designed to provide a convenient and economical means for making the connections and also to enable the handle or tongue to automatically remain at any angular position that may be desired so that if it is turned up when the truck is not in use it will maintain that position until it is turned down again when the truck is used.

Referring now to the drawings for the purpose of more particularly describing my improvements: Figure 1 is a plan view of a portion of a truck embodying my improvements. Fig. 2 is a vertical sectional view on an enlarged scale on the line $x$—$x$ of Fig. 1. Fig. 3 is a front elevation of a portion of the truck with part in vertical section. Fig. 4 is a perspective view of one of the lubricating boxes; and Fig. 5 is a perspective view of one of the handle supporting irons.

A is the platform of the truck. This platform may be composed of two superimposed portions.

B is the truck handle.

C are the caster wheels of which there may be either one or two secured to the forward part of the truck. In the drawings I have shown two of these caster wheels secured to the front of the truck for the purpose of more clearly illustrating my improved means of supporting the truck handle.

D is the axle of the caster wheels which may be made integral with the hub or secured to it.

E is a bearing plate adapted to be secured to the under surface of the truck platform in any suitable manner.

F is a disk which is adapted to be secured to the plate E with freedom to rotate. I prefer to connect the disk F with the plate E by means of a pivot stud G' extending through a hub e in the plate E. The disk F is thus free to rotate upon its pivot stud. The disk F is preferably cup shaped as shown and the plate E provided with an annular depressed portion E' which projects into the disk F and communicates therewith through openings f. By this means lubricant supplied to the plate E may be supplied to the cup shaped disk F. The plate E may be provided with a grooved or recessed lip G fitting up into the edge of the base of the platform through which lubricant may be supplied to the depressed portion of the plate E and may pass thence to the disk F. These details however, are not essential to my invention.

H, H are downwardly extending arms carried by the disk F having their lower edges formed into bearings for the axles D of the wheels C. These arms H, H are enlarged or reinforced at their bearing portion preferably outwardly or externally as shown at h so as to form wider bearings for the axles and permit longer axles to be employed. The arms H, H are reinforced preferably both outwardly and inwardly as shown, that is the enlargements or reinforcements may be on both sides of the body of the arms H.

I are bearing cups adapted for attachment to the arms H, H as by screws J, and are provided with bearing faces i for the lower portions of the axles D. These cups I are adapted to contain lubricant and supply it to the axles D and their bearings. They may be provided with openings j to admit the lubricant. With this construction an excellent caster wheel may be easily kept in a properly lubricated condition. The disk F which carries the caster wheel being pivoted to the plate E may turn freely on the pivot stud G' when the truck is moved.

K are U shaped pieces adapted for attachment to the frame of the truck with the two free ends k projecting beyond the front edge thereof. Between these free ends k, k the end of the tongue or handle may be attached by means of a bolt L carried by the parts k and passing through an eye M on the end of the handle. By means of a nut N on the end of the bolt the two parts k, k may be drawn together thus creating friction between their inner faces and the eye of the handle so that the handle may be maintained in any position desired. By adjusting the nut N the parts k, k may be tightened or loosened so as to permit the eyes M to turn upon the bolts L while exerting sufficient friction upon the eyes M to maintain the tongue or handle at any angle to which it may be moved.

The preferable method of securing the pieces K to the platform A is that shown in the drawings. The pieces K are placed between the two sections of the platform and are fastened by one of the bolts or screws O which secures the plate E to the under surface of the platform. This bolt or screw O extends within the bend of the U shaped piece K as is indicated in the dotted lines in Fig. 2 and thus fastens the piece K to the platform with the parts k, k projecting beyond the edge. The wood of the platform may be suitably recessed to receive the piece K.

To permit the adjustment of the pieces K or to adapt them to plates E of different sizes they may be provided with bolt holes o located in the bent portions of the body to receive the bolt or screw O which may be passed through this hole o instead of within the bend of the U.

I have shown the tongue or handle B applied to a truck having a pair of front caster wheels. It is apparent that it may be equally applied to a truck having a single front caster wheel, and that the pieces K may be secured to the platform by fastenings independent of the bolts or screws O which secure the plates E to the platform. The body of the pieces U may be grooved out as shown at u to decrease the amount of metal employed and the weight of the pieces.

The minor details of construction shown may be varied without departing from the invention.

What I claim as new, and desire to secure by Letters Patent, is—

1. In a truck, the combination of a rotary caster wheel frame having depending arms forming bearings and having the metal of the depending portions enlarged or reinforced to form widened bearing surfaces integral with the metal of the arms, and a caster wheel carried by the depending arms of the caster wheel frame and having its axle working on the widened bearing surfaces of the depending arms.

2. In a truck, the combination of a rotary caster wheel frame having depending arms forming bearings and having the metal of the depending portions enlarged or reinforced externally to form widened bearing surfaces integral with the metal of the arms, and a caster wheel carried by the depending arms of the caster wheel frame and having its axle working on the widened bearing surfaces of the depending arms.

3. In a truck, the combination of a rotary caster wheel frame having depending arms forming bearings and having the metal of the depending portions enlarged or reinforced externally to form widened bearing surfaces integral with the metal of the arms, a caster wheel carried by the depending arms of the caster wheel frame and having its axle working on the widened bearing surfaces of the depending arms, and lubricating cups carried by the depending arms and forming the lower bearings for the axle of the wheel with their outer faces extended outwardly to admit the externally widened bearing portions of the depending arms.

4. In a truck, the combination with the platform of a tongue fastening piece carried by the truck and provided with two projecting parts, the tongue or handle having an eye upon its end located between the projecting parts, a bolt or screw carried by the two projecting parts and passing through the eye of the tongue and means to draw the two projecting parts of the tongue fastening piece together in frictional contact with the eye of the tongue.

5. In a truck, the combination of the platform, a tongue clamping piece carried thereby and having projecting parts k, k, a bolt L extending through the ends of the parts k k, a tongue having its end journaled on the bolt L, and means to draw the parts k, k together in frictional contact with the end of the tongue.

6. In a truck, the combination with the platform of a tongue piece carried thereby and having projecting parts k k, a tongue secured between the parts k, k, a caster wheel bearing plate and caster wheel, and a bolt securing both the caster wheel bearing plate and the tongue piece to the platform.

7. The tongue securing piece for securing tongues or handles to trucks consisting of the U shaped metal piece K having the projecting arms k, k.

In testimony of which invention I have hereunto set my hand.

G. F. ARMSTRONG.

Witnesses:
 ERNEST HOWARD HUNTER,
 O. M. DIETTERICH.